(12) United States Patent
Varnoux et al.

(10) Patent No.: US 9,086,139 B2
(45) Date of Patent: Jul. 21, 2015

(54) PREASSEMBLED PULLEY DEVICE WITH ELASTIC RING AND METHOD OF MOUNTING THE DEVICE

(75) Inventors: Laurent Varnoux, Saint-Avertin (FR); Romuald Lescorail, Saint Laurent en Gatines (FR)

(73) Assignee: AKTIEBOLAGET SKF, Gothenburg (SE)

(*) Notice: Subject to any disclaimer, the term of this patent is extended or adjusted under 35 U.S.C. 154(b) by 791 days.

(21) Appl. No.: 13/376,768

(22) PCT Filed: Jun. 9, 2010

(86) PCT No.: PCT/EP2010/058079
§ 371 (c)(1),
(2), (4) Date: Feb. 2, 2012

(87) PCT Pub. No.: WO2010/142721
PCT Pub. Date: Dec. 16, 2010

(65) Prior Publication Data
US 2012/0142470 A1    Jun. 7, 2012

(30) Foreign Application Priority Data
Jun. 12, 2009  (FR) ...................................... 09 53929

(51) Int. Cl.
| | |
|---|---|
| *F16H 7/20* | (2006.01) |
| *F16H 55/36* | (2006.01) |
| *F16C 13/00* | (2006.01) |
| *F16C 19/16* | (2006.01) |
| *F16C 35/077* | (2006.01) |
| *F16H 57/00* | (2012.01) |

(52) U.S. Cl.
CPC .............. *F16H 55/36* (2013.01); *F16C 13/006* (2013.01); *F16C 19/163* (2013.01); *F16C 35/077* (2013.01); *F16H 57/0025* (2013.01); *Y10T 29/49826* (2015.01)

(58) Field of Classification Search
CPC . Y01S 474/902; Y01S 464/901; F16H 55/36; F16C 35/04; B60B 27/0078
USPC ................... 474/199, 902; 464/901; 417/362; 384/428, 539, 544
See application file for complete search history.

(56) References Cited

U.S. PATENT DOCUMENTS 5,443,372 A * 8/1995 Kanoll ........................... 417/319
6,164,929 A * 12/2000 Kazuya et al. ................ 417/362
(Continued)

FOREIGN PATENT DOCUMENTS

| EP | 1429042 A1 | 6/2004 |
|---|---|---|
| FR | 2790521 A1 | 9/2000 |
| GB | 2118640 A | 11/1983 |

*Primary Examiner* — William E Dondero
*Assistant Examiner* — Minh Truong
(74) *Attorney, Agent, or Firm* — Bryan Peckjian; SKF USA Inc. Patent Dept.

(57) ABSTRACT

In a method for fitting a preassembled pulley subassembly (1) on a rotary machine (2), the preassembled subassembly comprising a pulley (7), a rolling bearing (8), a plate (9) and an elastic ring (23) positioned around a shoulder (9a) of the plate (9), the following steps are carried out:—the bearing (8) is mounted on a hollow shaft (10) of the rotary machine (2) and, at the same time, a hub (20) of the plate (9) is mounted on a rotary spindle (4) of the rotary machine (2), that passes through the hollow shaft (10),—the elastic ring (23) of the plate (9) is slid axially until it enters a groove (10a) in the hollow shaft (10) of the rotary machine.

14 Claims, 5 Drawing Sheets

(56) References Cited

U.S. PATENT DOCUMENTS

| | | | |
|---|---|---|---|
| 6,332,842 B1* | 12/2001 | Tabuchi et al. | 464/33 |
| 6,561,770 B2* | 5/2003 | Okuda | 417/223 |
| 6,918,728 B1* | 7/2005 | Frauhammer et al. | 411/518 |
| 7,125,191 B2* | 10/2006 | Murase et al. | 403/1 |
| 7,645,196 B2* | 1/2010 | Brinkmann et al. | 464/32 |
| 7,909,701 B2* | 3/2011 | Ishikawa et al. | 464/32 |
| 7,922,611 B2* | 4/2011 | Tada et al. | 474/70 |
| 8,414,271 B2* | 4/2013 | Varnoux et al. | 417/319 |
| 8,690,546 B2* | 4/2014 | Standke | 417/319 |
| 2007/0270257 A1* | 11/2007 | Tada et al. | 474/70 |
| 2013/0337952 A1* | 12/2013 | Berruet et al. | 474/94 |

* cited by examiner

PREASSEMBLED PULLEY DEVICE WITH ELASTIC RING AND METHOD OF MOUNTING THE DEVICE

The present invention relates to the field of torque transmission devices used in particular in belt-driven rotary machines, for example motor vehicle air conditioning compressors.

In such compressor drive devices, a belt-driven pulley drives the transmission spindle of the compressor via a drive plate. The pulley is mounted on the outer ring of a rolling bearing the inner ring of which is secured to a hollow shaft of the compressor housing. This type of device is described particularly in document FR 2 790 521.

However, it is necessary to mount the rolling bearing equipped with its pulley on the compressor shaft and then to fit a circlip (a radially split elastic ring) that axially secures the rolling bearing to the shaft, in a slot machined in the shaft and then finally to mount the drive plate. The number of operations carried out at the premises of the manufacturer who manufactures the compressor is therefore high. These operations (particularly the fitting of the circlip) are also difficult to automate. This leads to high costs. Further, small elastic components such as circlips have an annoying tendency, when they are being fitted, to relax elastically and spring out of sight of the operator, or into inaccessible locations. It is therefore often necessary to provide surplus stocks of circlips at the assembly site.

It is an object of the invention to remedy the abovementioned disadvantages. The invention proposes a torque transmission device that requires a lower number of operations for mounting it on the driven component, making it being possible for these operations to be automated.

The subject of the invention is a method for fitting a preassembled pulley subassembly on a rotary machine, the preassembled subassembly comprising a pulley, a rolling bearing, a plate and an elastic ring positioned around a shoulder of the plate. The method involves the following steps:
  the bearing is mounted on a hollow shaft of the rotary machine and, at the same time, a hub of the plate is mounted on a rotary spindle of the rotary machine, that passes through the hollow shaft,
  the elastic ring of the plate is slid axially until it enters a groove in the hollow shaft of the rotary machine.

Preferably, the plate and the rotary spindle are secured to one another axially and in terms of rotation, which step may take place before the elastic ring is slid. In order to slide the elastic ring, a tool is inserted into axial drillings in the plate, so as to press axially on the elastic ring held elastically on the shoulder of the plate, and so as to move this elastic ring towards the groove in the hollow shaft of the rotary machine.

Another aspect of the invention is a pulley system for a rotary machine, particularly for a compressor. The system comprises a pulley, a rolling bearing and a plate, the pulley being secured to an outer ring of the rolling bearing and secured to the plate. The inner ring of the rolling bearing is able to be mounted on a hollow static shaft of the rotary machine and held axially in place by an elastic ring circumferentially surrounding the shaft. The plate is able to transmit a rotational movement from the pulley to a central hub of the plate. The plate has an axial first annular surface able to be positioned substantially facing the axial end of the shaft and able to accept an elastic ring, the unstressed diameter of which is smaller than the inside diameter of the inner ring of the rolling bearing, and the plate has at least two distinct mounting drillings for mounting the hub and that pass axially through the plate.

Advantageously, the axial annular surface of the plate is contiguous with a radial second annular surface of the plate, the mean diameter of which is greater than the diameter of the first surface and which is set back from the axial first annular surface with respect to the shaft that the plate is to face.

Preferably, the mounting drillings pass through the radial second surface.

Advantageously, the minimum distance between the axial first surface and the drillings is less than 5 mm.

Advantageously, the diameter of the axial first surface ranges between 0.8 and 1.5 times the inside diameter of the inner ring of the rolling bearing. By preference, the diameter of the axial first surface may range between 1 and 1.3 times the inside diameter of the inner ring of the rolling bearing. The axial surface may have an axial length of between 0.5 and 5 mm.

According to one embodiment, the axial annular surface of the plate is contiguous with a third annular surface of the plate, the mean diameter of which is smaller than the diameter of the first surface, the third annular surface lying axially between the axial first annular surface and the shaft that the plate is to face.

In an alternative form the third annular surface is a radial surface.

In another alternative form, the third annular surface is a surface of revolution, the diameter of which decreases towards the shaft of the rotary machine, and the smallest diameter of which is greater than or equal to the inside diameter of the inner ring of the rolling bearing. In this alternative form, the third surface is considered to be interrupted, near the shaft, by a circle that forms a boundary with a radial surface or a concave surface of the plate separating the plate from the shaft. The smallest diameter of the third surface is then the diameter of this circle.

According to another aspect, a rotary machine comprises a static hollow shaft through which a rotary spindle passes, and a pulley device as described hereinabove, the inner ring of the rolling bearing being mounted on the shaft of the rotary machine and held axially in position by the elastic ring, and the hub of the plate being kept axially secured, and secured in terms of rotation, to the transmission spindle using a screw or a nut.

Advantageously, the axial thickness of the elastic ring is greater than or equal to the minimum axial distance between the third surface of the plate and the axial end of the shaft of the rotary machine.

The entire pulley device can be manufactured at a first industrial site and then delivered to a second industrial site where the subassembly is mounted on a driven machine, for example a compressor. The subassembly is mounted by performing an axial movement of the premounted subassembly with respect to the shaft and to the housing of the compressor, by screwing the drive plate to the spindle of the compressor, then by pushing the circlip axially using a tool entering via the axial end of the device, so as to move the circlip from its standby position on the shoulder of the transmission plate into its final position in the slot in the compressor housing.

The present invention will be better understood from reading the description of a number of embodiments which are given by way of entirely non limiting examples and illustrated in the attached drawings in which.

Figure 1:
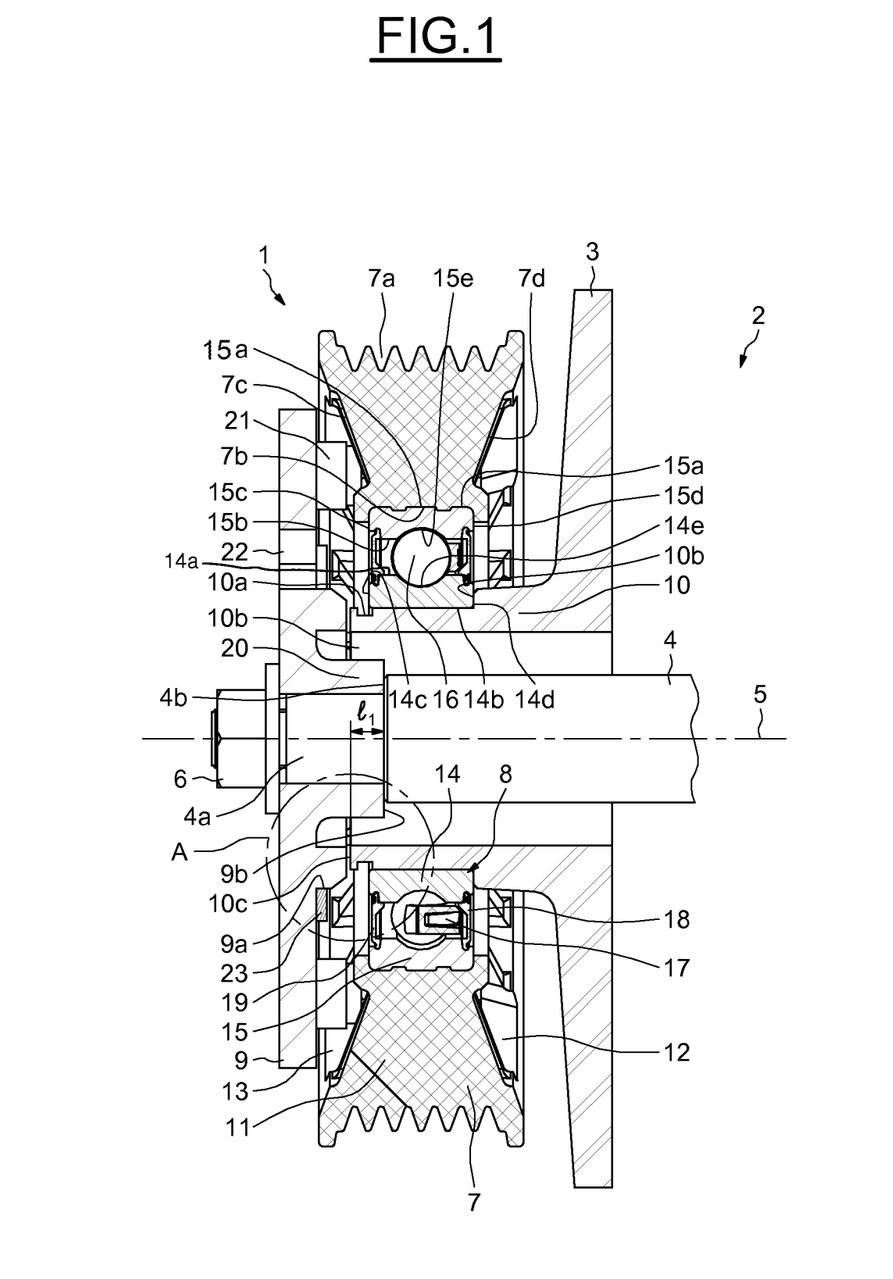
FIG. 1 is a view in axial section of a pulley device according to the invention, mounted on a compressor.
Figure 2:
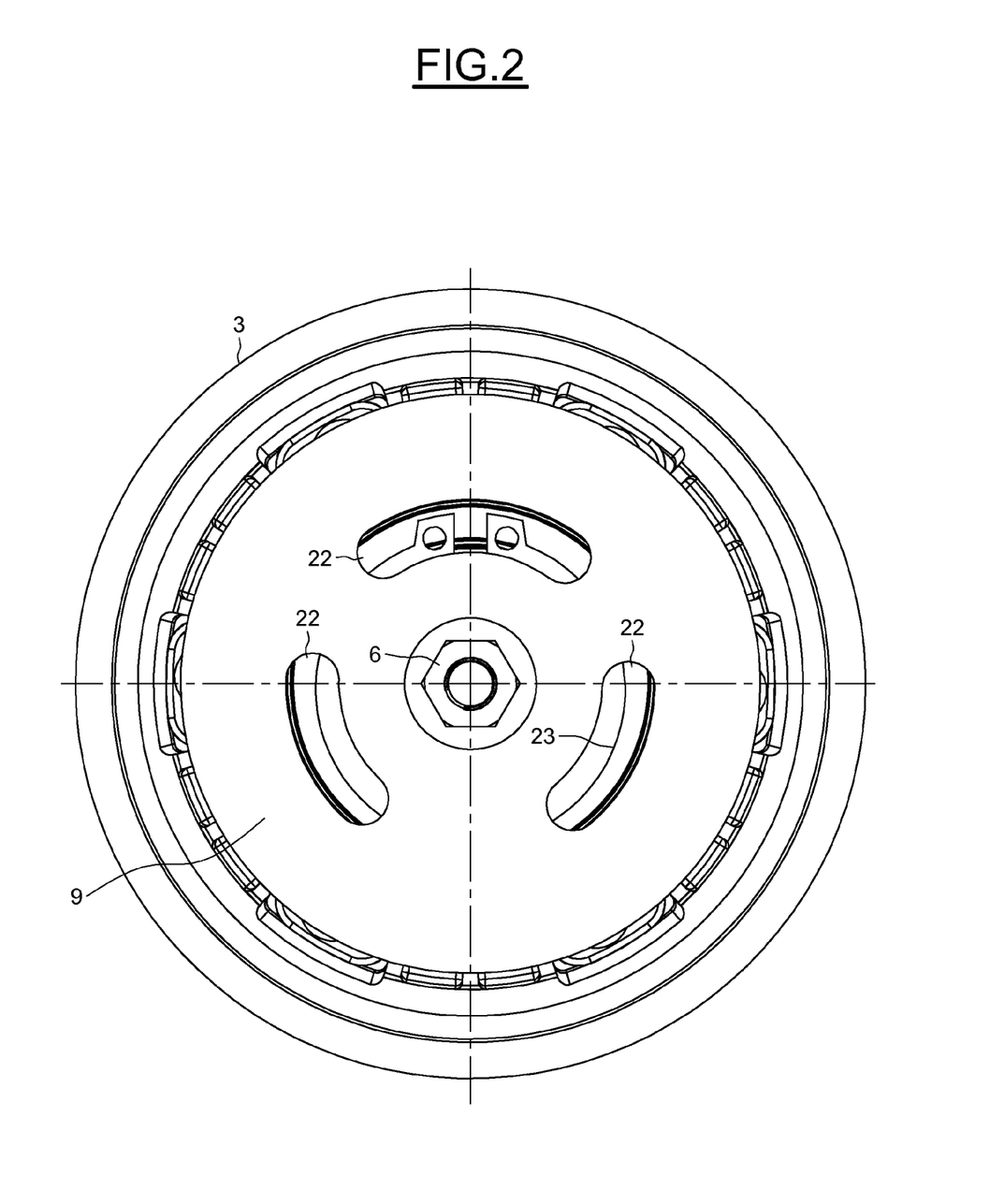
FIG. 2 is an end-on view of a pulley device according to the invention, mounted on a compressor.

In FIGS. 1 and 2, the pulley device 1 is mounted on a compressor 2 comprising a housing or casing 3 that does not rotate, and a transmission spindle 4 capable of rotating about an axis 5. The transmission spindle 4 may be provided with a stepped end 4a ending in a threaded portion so that it can interact with a nut 6. The stepped end 4a, of a smaller cross section than the remainder of the spindle 4, is delimited by a shoulder 4b. The transmission spindle 4 passes through a hollow shaft 10 of the housing, coaxial with the transmission spindle 4. The shaft 10 of the housing has a radial end surface 10c and a circumferential outer slot 10a near this end surface 10c, that is to say, the axial width of the slot is greater than, or equal to, the distance between the end surface 10c and the closest edge of the slot 10a. The axial distance between the radial end surface 10c of the shaft of the housing and the shoulder 4b of the spindle 4 represents an algebraic distance $l_1$, which is, for example, considered to be positive if, as in FIG. 1, the shoulder 4b is set back from the radial end surface 10c.

The pulley device 1 comprises a pulley 7, a rolling bearing 8 and a torque transmission plate 9. The pulley 7 has an exterior surface 7a intended to collaborate with a belt, not depicted, a bore 7b, and two lateral radial surfaces 7c and 7d, the surface 7d being arranged facing the casing 3, and the surface 7c being arranged on the opposite side to the casing 3. The outer surface 7a may have annular ribs to collaborate with a belt of the poly-V type for example. The bore 7b may have the form of annular ribs.

The pulley 7 may be made of resin, for example based on polyamide, phenolic resin or alternatively polyurethane.

The pulley 7 may comprise a solid annulus 11 and a plurality of stiffening ribs 12 arranged in planes that are axial with respect to the axis 5. The ribs 12 may be symmetric with respect to a radial plane perpendicular to the axis 5. A plurality of housings 13 are formed in the lateral surface 7c of the pulley 7. The housings 13 may be spaces between two ribs 12 or housings encroaching on the ribs 12.

The rolling bearing 8 comprises an inner ring 14, an outer ring 15, at least one row of rolling elements 16, a cage 17 to maintain uniform circumferential spacing of the rolling elements 16 and two seals 18 and 19. The inner ring 14 comprises an outer surface 14a of revolution, a bore 14b in contact with an axial surface 10a of the shaft 10 of the casing 3, and two lateral radial surfaces 14c and 14d, the lateral surface 14d being in contact with a radial surface 10b of the shaft 10, for example a shoulder. A raceway 14e of toroidal shape is formed by machining from the outer surface 14a.

The outer ring 15 comprises an outer surface 15a, a bore 15b and two transverse radial surfaces 15c and 15d respectively aligned with the radial surfaces 14c and 14d. A raceway 15e is created by machining from the bore 15b. The raceway 15e is of toroidal shape.

The rolling elements 16, for example balls, are positioned between the raceways 14e and 15e of the inner 14 and outer 15 rings. Annular slots are formed from the outer surface 15a of the outer ring 15 that complement the shapes of the ribs of the bore 7b of the pulley 7. The pulley 7 can be overmoulded on the outer ring 15 of the rolling bearing 8. This results in excellent cohesion between these two components. The seals 18 and 19 can be force-fitted into slots formed from the bore 15b and near the radial surfaces 15c and 15d of the outer ring 15.

The torque transmitting plate 9 is in the form of a one-piece component that may be made of a synthetic material or alternatively of a light alloy. The plate 9 comprises a sleeve tube 20 mounted on the end 4a of the transmission spindle 4. The sleeve tube 20 may be clamped between the nut 6 possibly supplemented by a washer, and the shoulder 4b of the spindle 4, against which it bears via an axial end surface 9b of the sleeve tube.

Starting from the end of the sleeve tube 20 that is situated axially at the opposite end from the casing 3, the plate 9 extends radially in the overall form of a disc out to an external circumference the diameter of which may be smaller than the maximum diameter of the pulley 7. On that face of this disc that faces the pulley 7, there are studs 21 for driving the pulley 7, which studs become inserted in the housings 13 on the surface 7c of the pulley. The studs 21 may be dimensioned such that they are forcibly inserted into the housings 13.

Figure 3A:
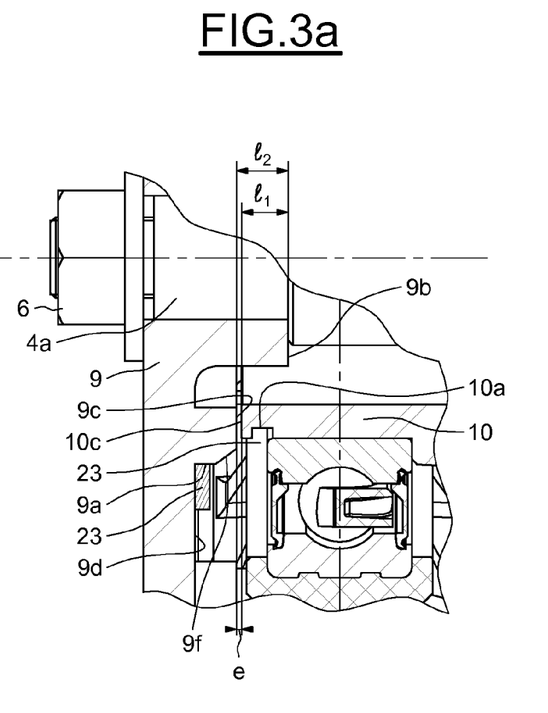
FIGS. 3a and 3b are sectioned views of a detail of the device of FIG. 1, at two different stages in its assembly on the compressor.
Figure 3B:
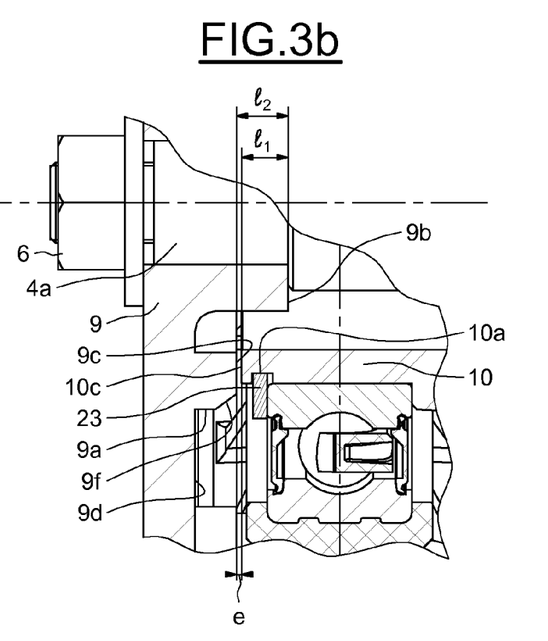

FIGS. 3a and 3b show cross sections of detail A of the device of FIG. 1, at two different stages in its assembly with the compressor. FIGS. 3a and 3b again show elements common to FIGS. 1 and 2, and the same elements therefore bear the same references. As illustrated in FIG. 3a, the plate 9 has a proximal radial surface 9c, in the form of a planar annular surface facing the radial end surface 10c of the shaft 10 of the housing, or at least facing it in the vicinity of the external circumferences 9c and 10c. The axial distance between the radial end surface 9b and the proximal radial surface 9c represents an algebraic distance $l_2$ which is, for example, considered to be positive if, as in FIG. 1, the sleeve tube 20 extends axially beyond the plate 9 with respect to the proximal radial surface 9c. In order to leave a positive end float $e = l_2 - l_1$ between the plate 9 and the shaft 10 of the casing, the dimension $l_2$ of the plate 9 is chosen to be greater (in terms of algebraic value) then the dimension $l_1$ of the rotary machine for which the pulley device is intended. In the configuration in FIG. 1, with the sign convention adopted, the dimension $l_2$ is also greater than the dimension $l_1$ in terms of absolute value.

Set back from the proximal radial surface 9c, the plate 9 has a prepositioning radial surface 9d, in the form of a flat annular surface coaxial with the surface 9c, separated axially from the surface 9c by a shoulder 9a. The shoulder 9a consists of an axial surface portion with an axial length of, for example, between 0.5 mm and 3 mm. In the embodiment depicted in FIGS. 1, 3a and 3b, there is a chamfer 9f connecting the shoulder 9a and the proximal radial surface 9c.

Three orifices or drillings 22, visible in FIGS. 1 and 2, pass axially through the prepositioning radial surface 9d. These drillings 22, in the form of three annulus portions centred on one and the same circle, are angularly equidistant and tangential to the surface of the shoulder 9a. It is possible to conceive of alternative forms of the invention in which there are just two diametrically opposed drillings, or in which the number of drillings is greater than three. It is possible to conceive of different shapes of drillings, for example round drillings or trapezoidal drillings. Instead of being tangential to the shoulder 9a, the drillings may be made in close proximity to the shoulder (for example at a distance of 1 mm to 3 mm from the shoulder) or alternatively the drillings may pass through the thickness of the plate 9 at the actual site of the shoulder 9a. The width of each drilling here is around 7 mm. More generally, the diameters (i.e. the smallest cross sections) of the drillings, whatever the shape of these drillings, may be of the order of 3 mm to 10 mm, so that the pins of a tool can pass through the orifice.

According to an alternative form of the invention, the drillings 22 may be uniformly spaced on a circle so that the bridges of plate material that remain between the drillings define a region of lower strength (by comparison with the rest of the plate) liable to rupture if the plate 9 attempts to transmit excessive torque.

A circlip, that is to say an elastic ring 23, visible in FIGS. 2 and 3b, is inserted in the circumferential slot 10a on the shaft of the casing, to hold the rolling bearing 8 axially in position.

FIGS. 1 and 3a depict the circlip 23 in its position at the time of delivery of the pulley device ready for mounting on the compressor. The circlip 23 is then positioned around the shoulder 9a of the plate, in a position that is radially distant from its final position on the shaft of the casing. The force with which the circlip returns elastically to its unstressed diameter keeps the inside circumference of the circlip compressed against the shoulder surface 9a. The resulting tangential friction force holds the circlip axially against the plate 9.

The pulley device comprising the pulley 7 overmoulded on the rolling bearing 8 and secured by means of the studs 21 to the plate 9, and the circlip 23 pressing against the shoulder 9a of the plate, can thus be delivered to a customer, user or assembler of the compressor 2 as a one-piece subassembly. A fitting tool like the one illustrated in FIGS. 5 and 6 may possibly be delivered with this subassembly.

The device can be mounted as follows. The subassembly comprising the pulley 7, the rolling bearing 8 and the torque-transmitting plate 9 is brought through an axial movement towards the shaft of the casing 10 and the transmission spindle 4. The inner ring 14 of the rolling bearing 8 is slid onto the exterior surface 10a of the shaft 10 of the casing 3 until it comes into abutment against the radial annular surface 10b. At the same time, the sleeve tube 20 of the torque transmitting plate 9 is mounted around the end 4a of the transmission spindle 4. Next, the nut 6 is screwed onto the threaded part of the spindle 4 to secure the plate 9 to the spindle 4 both axially and angularly. The condition thus obtained is illustrated in FIGS. 1 and 3a. A rotational torque transmitted by a belt (not depicted) to the pulley 7 and then to the transmission plate 9 can thus be transferred to the spindle 4.

Figure 5:
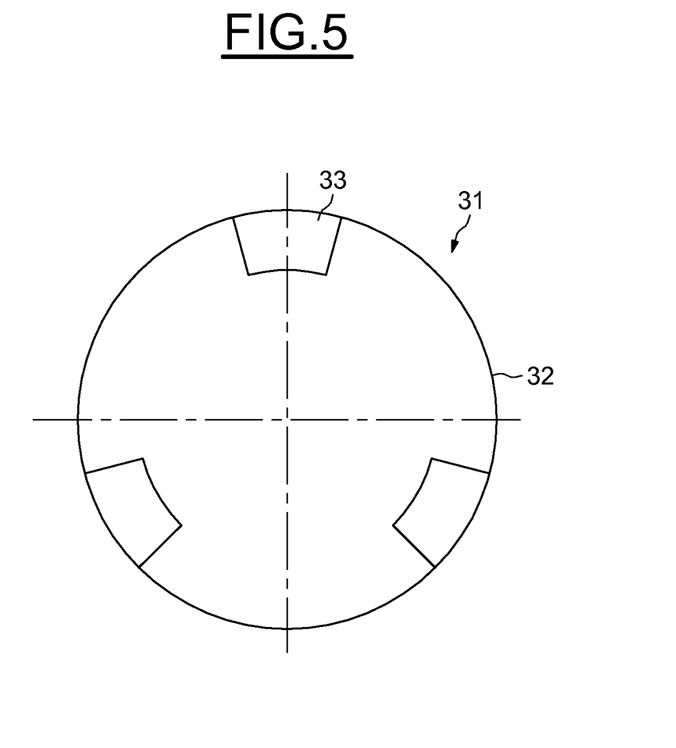
FIG. 5 is an end-on view of a fitting tool used to fit the circlip in FIGS. 1 and 2.
Figure 6:
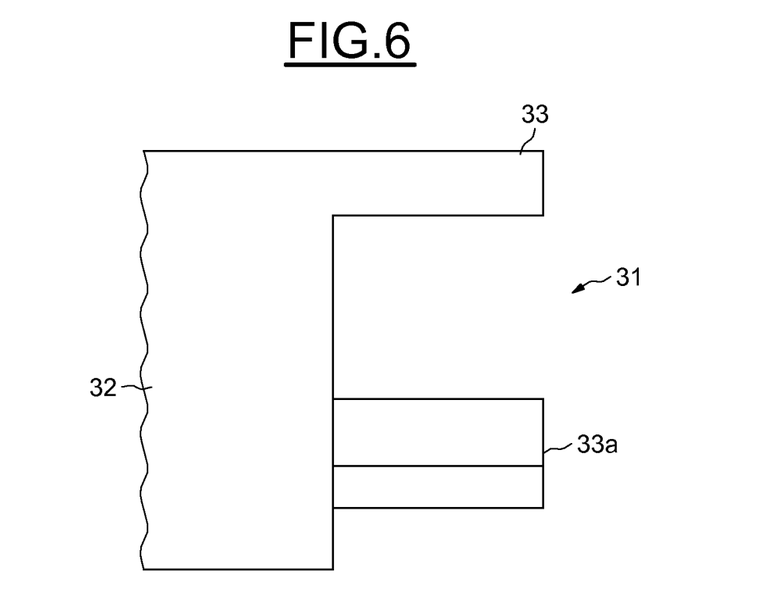
FIG. 6 is a side view of the fitting tool of FIG. 5.

In order to hold the rolling bearing 8 axially in position, a tool 31 depicted in FIGS. 5 and 6, will then be used to push on the circlip 23 through the drillings 22, so that the circlips slides off the shoulder 9a towards the slot 10a. The chamfer 9a of the plate makes it easier for the circlip to return gradually from its standby diameter on the shoulder 9a to its final diameter in the slot 10a of the casing. The condition then obtained is illustrated in FIGS. 2 and 3b.

In order to prevent the circlip 23 from coming to a halt during this translational movement, slipping between the proximal radial surface 9c of the plate and the radial end surface 10c of the shaft 10 of the casing, the thickness of the circlip has been designed to be greater than the distance, or in other words than the end float e, between these two surfaces. In other words, the thickness of the circlip is greater than the difference in algebraic lengths $l_2 - l_1$ defined previously, in which:

$l_2$ represents an algebraic distance between the radial end surface 9b and the proximal radial surface 9c of the plate 9, $l_1$ represents an algebraic distance between the radial end surface 10c of the shaft 10 of the casing and the shoulder 4b of the spindle 4.

The tool 31 illustrated in FIGS. 5 and 6 comprises a ring 32 supporting a plurality of axial pins 33 extending out from one and the same side of the ring 32. The pins 33 may have a radial free end 33a intended to press against the circlip. The pins 33 may be arranged around the axis of the tool so that when this axis is aligned with the axis 5 of the device, each pin 33 can press axially against the circlip 23 through a drilling 22.

Figure 4A:
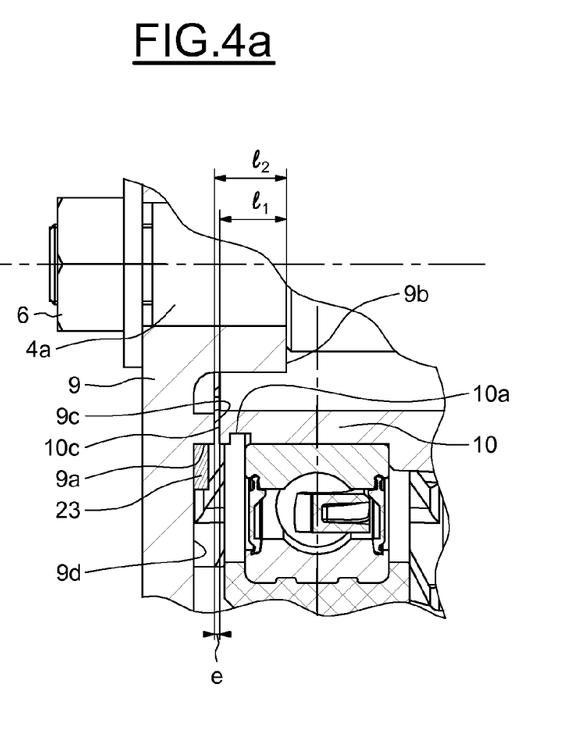
FIGS. 4a and 4b are sectioned views of a detail of another pulley device according to the invention, at two different stages in its assembly with a compressor.
Figure 4B:
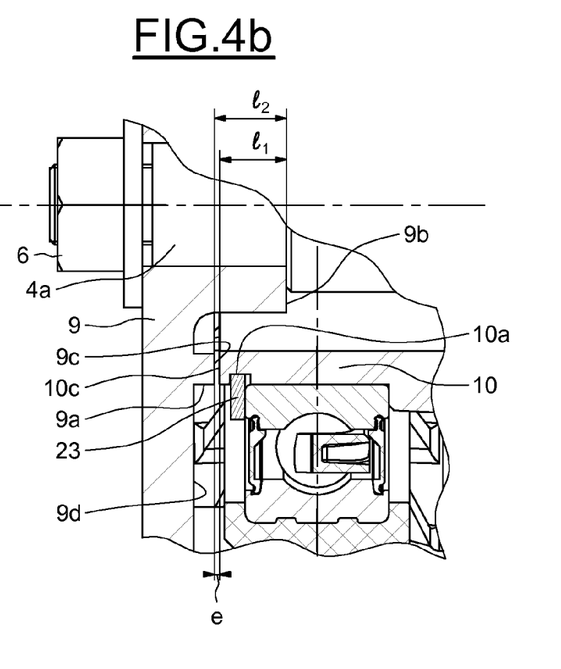

FIGS. 4a and 4b depict the same details of steps in the mounting of a device according to the invention as do FIGS. 3a and 3b. Here we again find elements common to FIGS. 3a and 3b with the elements therefore bearing the same references. In this other alternative form of the device according to the invention, the surface 9a of the shoulder of the plate is contiguous with the proximal surface 9c, making the process of manufacturing the plate 9 easier when the central part of this plate is produced by machining.

The invention is not restricted to the exemplary embodiment described, and can be varied in many ways particularly regarding the following: the relative positions of the surfaces 9d and 9c (the distance $l_1$ can be negative rather than positive, or in other words the end of the sleeve tube 20 could be set back with respect to the proximal surface 9c), the shape of the chamfer 9f, the dimensions, shape and spacings of the drillings 22, the way in which the plate 9 and the pulley 7 are secured together axially (for example using protrusions on the plate 9 which are inserted in the pulley 7 beyond the depth of the ribs). Rather than the pulley and the plate being secured axially by the studs, the means of axially securing the pulley and the plate could, for example, be removable means which are removed once the device has been fitted onto the casing and the spindle of the compressor, the plate could be screwed onto the spindle of the compressor and a circlip fitted, the nut then maintaining axial contact between the pulley and the plate. It is also possible to conceive of replacing the circlip with a disposable locking washer fitted with locking claws which allow the washer to slide axially in only one direction. In that case, the shaft of the casing could be free of an annular groove and the diameter of the shoulder 9a could be smaller than the diameter of the shaft of the casing, itself substantially equal to the inside diameter of the inner ring of the rolling bearing.

With the pulley device according to the invention, the operation of mounting on the component that is to be driven, which is performed at the premises of the equipment manufacturer, becomes very simple. Mounting can boil down to axial fitting of the premounted subassembly, screwing of a screw or of a nut onto the spindle intended to receive the torque of the pulley, and exerting an axial pushing action, using the suitable tool, to fit the circlip into the groove in the shaft of the casing. This then results in a significant reduction in the costs of mounting a driven component, particularly an air-conditioning compressor in a motor vehicle. It also reduces the number of different stock components to be managed, and the risk of one or more components of the subassembly, particularly the circlip, being lost.

The invention claimed is:
1. A pulley system for a rotary machine, comprising:
a pulley,
a rolling bearing and
a plate, wherein
the pulley is assembled to an outer ring of the rolling bearing and assembled to the plate, and wherein
an inner ring of the rolling bearing is configured to be mounted on a hollow static shaft of the rotary machine and held axially in place by an elastic ring circumferentially surrounding the shaft, and wherein the plate is configured to transmit a rotational movement from the pulley to a central hub of the plate, and wherein the plate has an axial first annular surface positioned adjacent to an axial end of the shaft and configured to accept the elastic ring, the first annular surface having a first end located a first distance from the rolling bearing and a second end located a second distance from the rolling bearing, the second distance being greater than the first distance, and wherein an unstressed inner diameter of the elastic ring is smaller than an inside diameter of the inner ring, and the plate has at least two mounting drillings distinct from a center opening of the hub and passing axially through the plate, and wherein a radial second, flat, annular surface of the plate has a first end at the second end of the axial first annular surface, a mean diameter of the radial second, flat, annular surface being greater than a diameter of the axial first annular surface, and wherein the mounting drillings pass through the radial second, flat, annular surface.

2. The pulley system according to claim 1, wherein a minimum distance between the axial first surface and the drillings is less than 5 mm.

3. The pulley system according to claim 1, wherein a diameter of the axial first annular surface is from 0.8 to 1.5 times the inside diameter of the inner ring of the rolling bearing, and wherein the axial surface has an axial length of from 0.5 to 5 mm.

4. The pulley system according to claim 1, wherein the axial annular surface of the plate is contiguous with a third annular surface of the plate, and wherein a mean diameter of the third annular surface is smaller than the diameter of the first surface, the third annular surface lying axially between the axial first annular surface and the shaft.

5. The pulley system according to claim 4, wherein the third annular surface is a radial surface.

6. A rotary machine comprising:

a static hollow shaft through which a rotary spindle passes, and the pulley system according to claim 3, wherein the inner ring of the rolling bearing is mounted on the shaft of the rotary machine and held axially in position by the elastic ring, and wherein the hub of the plate is kept axially and rotationally secured to the transmission spindle using one of a screw and a nut.

7. The rotary machine according to claim 6, wherein an axial thickness of the elastic ring is greater than or equal to a minimum axial distance (e) between a third surface of the plate and the axial end of the shaft of the rotary machine.

8. The pulley system according to claim 1, wherein the first annular surface of the plate is contiguous with a third annular surface of the plate, the third annular surface comprising a surface of revolution a diameter of which decreases towards the shaft of the rotary machine, and a smallest diameter of which is greater than, or equal to, the inside diameter of the inner ring of the rolling bearing and wherein a mean diameter of the third annular surface is smaller than the diameter of the first surface and the third annular surface lies axially between the first annular surface and the shaft.

9. The pulley system according to claim 8, wherein the third annular surface is frusto-conical.

10. A method for fitting a preassembled pulley subassembly on a rotary machine, the preassembled subassembly comprising:

a pulley, a rolling bearing, a plate having a hub and an axial first annular surface having a first end and a second end and the plate having a radial second, flat, annular surface having a first end and a second end, the first end of the radial second, flat, annular surface being located at the second end of the axial first annular surface, a mean diameter of the radial second, flat, annular surface being greater than a diameter of the axial first annular surface, and the second, flat, annular surface having at least two mounting drillings distinct from a center opening of the hub, and an elastic ring positioned on the first annular surface, and wherein the method comprises:

mounting the bearing on a hollow shaft of the rotary machine and, after mounting the bearing, mounting the hub of the plate on a rotary spindle of the rotary machine, that passes through the hollow shaft such that the axial first annular surface is adjacent to an axial end of the hollow shaft, and inserting a tool into at least one of the at least two mounting drillings to slide the elastic ring of the plate axially off the first annular surface until the elastic ring enters a groove in the hollow shaft of the rotary machine.

11. The method according to claim 1, wherein the first annular surface of the plate is contiguous with a third annular surface of the plate, the third annular surface comprising a surface of revolution a diameter of which decreases towards the shaft of the rotary machine, and a smallest diameter of which is greater than, or equal to, an inside diameter of an inner ring of the rolling bearing and wherein a mean diameter of the third annular surface is smaller than the diameter of the first surface and the third annular surface lies axially between the first annular surface and the shaft.

12. The method according to claim 11, wherein the third annular surface is frusto-conical.

13. A pulley system for a rotary machine, comprising:

a rolling bearing having an inner ring and an outer ring, the inner ring being mounted on a hollow static shaft of the rotary machine;

an elastic ring extending circumferentially around the shaft and holding the inner ring of the bearing axially in place, an unstressed inner diameter of the elastic ring being smaller than an inside diameter of the inner ring, the elastic ring having an outer diameter and a ring thickness from the inner diameter to the outer diameter, a plate having a central hub mounted to the rotary machine, the plate having a shoulder positioned adjacent to an axial end of the shaft, the shoulder being configured to accept the elastic ring and the plate including at least two openings distinct from a center opening of the hub, and a pulley assembled to the outer ring of the rolling bearing and assembled to the plate wherein the plate is configured to transmit a rotational movement from the pulley to the central hub of the plate, and wherein at least one of the at least two openings has an edge radially spaced from the shoulder by a distance less than or equal to about the ring thickness, and wherein the shoulder is contiguous with an annular surface of the plate, the annular surface comprising a surface of revolution a diameter of which decreases towards the shaft of the rotary machine, and a smallest diameter of which is greater than, or equal to, the inside diameter of the inner ring of the rolling bearing and wherein a mean diameter of the annular surface is smaller than a diameter of the shoulder and the annular surface lies axially between the shoulder and the shaft.

14. The pulley system according to claim 13, wherein the annular surface is frusto-conical.

* * * * *